United States Patent
Baker et al.

(10) Patent No.: US 11,663,665 B2
(45) Date of Patent: *May 30, 2023

(54) SLICER ORDER QUANTITY REDUCTION TOOL

(71) Applicant: TRADING TECHNOLOGIES INTERNATIONAL INC., Chicago, IL (US)

(72) Inventors: William Tigard Baker, Redmond, WA (US); Andrew Theodore Renalds, Chicago, IL (US); Iliar Mangutov, Hinsdale, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,512

(22) Filed: Dec. 27, 2019

(65) Prior Publication Data

US 2020/0151819 A1 May 14, 2020

Related U.S. Application Data

(63) Continuation of application No. 16/287,164, filed on Feb. 27, 2019, now Pat. No. 10,565,653, which is a
(Continued)

(51) Int. Cl.
*G06Q 40/04* (2012.01)
(52) U.S. Cl.
CPC ................... *G06Q 40/04* (2013.01)
(58) Field of Classification Search
CPC ....................................................... G06Q 40/04
(Continued)

(56) References Cited

U.S. PATENT DOCUMENTS 5,671,363 A 9/1997 Cristofich et al.
5,774,877 A 6/1998 Patterson, Jr. et al.
(Continued)

FOREIGN PATENT DOCUMENTS

CA 2469510 A1 6/2002
CA 2724040 A1 12/2009
(Continued)

OTHER PUBLICATIONS

Foley, K., "Electronic Trading Networks, Stock Exchange Competition," FDCH Congressional Testimony, Oct. 17, 2002.
(Continued)

*Primary Examiner* — Hao Fu
(74) *Attorney, Agent, or Firm* — McDonnell Boehnen Hulbert & Berghoff LLP

(57) ABSTRACT

The disclosed embodiments generally relate to a slicer order quantity reduction tool. An example method for reducing a quantity of a slicer order includes calculating a collective quantity associated with available ones of a plurality of child orders; comparing the collective quantity and a reduction amount received in connection with a quantity reduction request for the slicer order; and determining, when the comparison indicates that the available ones of the child orders have insufficient quantity to meet the reduction amount, whether inflight ones of the plurality of child orders collectively have sufficient quantity to make up a shortfall of the available ones of the child orders.

16 Claims, 7 Drawing Sheets

Related U.S. Application Data continuation of application No. 14/244,590, filed on Apr. 3, 2014, now Pat. No. 10,255,634, which is a continuation of application No. 13/416,561, filed on Mar. 9, 2012, now Pat. No. 8,732,067.

(58) Field of Classification Search
USPC .......................................................... 705/37
See application file for complete search history.

(56) References Cited

U.S. PATENT DOCUMENTS

| | | | |
|---|---|---|---|
| 6,401,080 | B1 | 6/2002 | Bigus et al. |
| 6,615,188 | B1 | 9/2003 | Breen et al. |
| 6,772,132 | B1 | 8/2004 | Kemp, II et al. |
| 6,912,511 | B1 | 6/2005 | Eliezer et al. |
| 6,983,260 | B2 | 1/2006 | Hummelgren |
| 7,127,424 | B2 | 10/2006 | Kemp, II et al. |
| 7,171,386 | B1* | 1/2007 | Raykhman ............. G06Q 40/04 705/37 |
| 7,181,425 | B1 | 2/2007 | Cha |
| 7,243,082 | B1 | 7/2007 | Forlai |
| 7,299,207 | B1 | 11/2007 | Gologorsky et al. |
| 7,299,208 | B1 | 11/2007 | Bailon et al. |
| 7,305,361 | B2 | 12/2007 | Otero et al. |
| 7,359,877 | B2 | 4/2008 | Malitzis et al. |
| 7,379,909 | B1 | 5/2008 | Cruz et al. |
| 7,389,268 | B1 | 6/2008 | Kemp, II et al. |
| 7,406,444 | B2 | 7/2008 | Eng et al. |
| 7,428,506 | B2 | 9/2008 | Waelbroeck et al. |
| 7,496,535 | B2 | 2/2009 | Otero et al. |
| 7,613,647 | B1 | 11/2009 | Cushing et al. |
| 7,617,144 | B2 | 11/2009 | Madoff et al. |
| 7,653,589 | B1 | 1/2010 | Schluetter et al. |
| 7,685,052 | B2 | 3/2010 | Waelbroeck et al. |
| 7,822,672 | B2 | 10/2010 | Hausman |
| 8,041,622 | B1 | 10/2011 | Schluetter et al. |
| 8,380,575 | B2 | 2/2013 | Foygel et al. |
| 8,732,067 | B2 | 5/2014 | Baker et al. |
| 10,255,634 | B2 | 4/2019 | Baker et al. |
| 10,497,056 | B2 | 12/2019 | Schluetter et al. |
| 10,565,653 | B2 | 2/2020 | Baker et al. |
| 2001/0032163 | A1 | 10/2001 | Fertic et al. |
| 2001/0044752 | A1 | 11/2001 | Hirakawa |
| 2001/0044767 | A1 | 11/2001 | Madoff et al. |
| 2002/0032643 | A1 | 3/2002 | Himmelstein |
| 2002/0046146 | A1 | 4/2002 | Otero et al. |
| 2002/0046149 | A1 | 4/2002 | Otero et al. |
| 2002/0046151 | A1 | 4/2002 | Otero et al. |
| 2002/0046156 | A1 | 4/2002 | Horn et al. |
| 2002/0049661 | A1 | 4/2002 | Otero et al. |
| 2002/0052816 | A1 | 5/2002 | Clenaghan et al. |
| 2002/0052827 | A1 | 5/2002 | Waelbroeck et al. |
| 2002/0073016 | A1 | 6/2002 | Furbush et al. |
| 2002/0091624 | A1 | 7/2002 | Glodjo et al. |
| 2002/0133454 | A1 | 9/2002 | Malitzis et al. |
| 2002/0147675 | A1 | 10/2002 | Das et al. |
| 2002/0178104 | A1 | 11/2002 | Hausman |
| 2003/0033235 | A1 | 2/2003 | Hummelgren |
| 2003/0093359 | A1 | 5/2003 | Martyn et al. |
| 2003/0126065 | A1 | 7/2003 | Eng et al. |
| 2003/0167224 | A1 | 9/2003 | Periwal |
| 2003/0236737 | A1 | 12/2003 | Kemp, II et al. |
| 2004/0059666 | A1 | 3/2004 | Waelbroeck et al. |
| 2004/0143539 | A1 | 7/2004 | Penney et al. |
| 2006/0129473 | A1* | 6/2006 | Hansen .................. G06Q 40/04 705/37 |
| 2009/0299890 | A1 | 12/2009 | Kontos et al. |
| 2010/0332367 | A1 | 12/2010 | Foygel et al. |
| 2011/0145125 | A1 | 6/2011 | Foygel et al. |
| 2011/0307372 | A1 | 12/2011 | Schluetter et al. |
| 2011/0313907 | A1 | 12/2011 | Schluetter et al. |
| 2011/0313908 | A1 | 12/2011 | Schluetter et al. |
| 2011/0313909 | A1 | 12/2011 | Schluetter et al. |
| 2012/0005060 | A1 | 1/2012 | Carroll et al. |
| 2013/0238479 | A1 | 9/2013 | Baker et al. |
| 2014/0297505 | A1 | 10/2014 | Baker et al. |
| 2019/0197623 | A1 | 6/2019 | Baker et al. |
| 2020/0098043 | A1 | 3/2020 | Schluetter et al. |

FOREIGN PATENT DOCUMENTS

| | | |
|---|---|---|
| EP | 1104904 A1 | 6/2001 |
| WO | 00/51043 A1 | 8/2000 |
| WO | 00/65510 A1 | 11/2000 |
| WO | 01/22266 A2 | 3/2001 |
| WO | 02/33621 A1 | 4/2002 |
| WO | 02/33623 A1 | 4/2002 |
| WO | 02/33635 A1 | 4/2002 |
| WO | 02/33636 A1 | 4/2002 |
| WO | 02/33637 A1 | 4/2002 |
| WO | 02/47006 A1 | 6/2002 |
| WO | 02/86657 A2 | 10/2002 |
| WO | 02/93325 A2 | 11/2002 |
| WO | 09/146363 A1 | 12/2009 |
| WO | 12/003093 A1 | 1/2012 |

OTHER PUBLICATIONS

Niemeyer, Jonas (An Empirical Analysis of the Trading Structure at the Stockholm, Working Paper No. 44, Stockholm School of Economics: The Economic Research Institute, Jan. 1995) (Year: 1995).

Schnitzlein, C., "Call and Continuous Trading Mechanisms Under Asymmetric Information: An Experimental Investigation," *Journal of Finance,* vol. L1, No. 2, Jun. 1996, pp. 613-636.

Trading Technologies, Synthetic Order Entry in X_ TRADER® 7.9.1, Setup Guide, Mar. 10, 2011, 26 pages.

Trading Technologies, Synthetic Order Entry in X_TRADER® 7.11.x, Setup Guide, Mar. 20, 2012, 36 pages.

Trading Technologies, Staged Orders in X_TRADER® 7.11.x, Setup Guide, Oct. 25, 2011, 18 pages.

Trading Technologies, Synthetic Strategy Engine [online], [retrieved on Apr. 2, 2012]. Retrieved from the Internet <URL: http://https://www.tradingtechnologies.com/synthetic-se />.

Trading Technologies, Synthetic Order Entry in X_TRADER® presentation [online] [retrieved on Apr. 2, 2012], Available on the Internet <https://www.tradingtechnologies.com/Global/eLearning/Synthetic%20Order%20Entry%20in%20X_TRADER.exe>.

Trading Technologies Online Product Help, Sliced Orders [online], [retrieved on Apr. 2, 2012], Retrieved from the Internet <URL: https://www.tradingtechnologies.com/help/X_TRADER-7.9.X/Default.htm>.

Rosen, J. (Ed.) The Handbook of Electronic Trading, Capital Markets Media, 2008. Retrieved from https://www.iqpc.com/media/1003808/45039.pdf.

* cited by examiner

| | EXCH | PROD | CONTRACT | STATUS | B/S | ORDER QTY | UND QTY | FILLED QTY | PRICE | ORDER TYPE | TIF | MOD. | TRIGGER PRICE | ADV. |
|---|---|---|---|---|---|---|---|---|---|---|---|---|---|---|
| 1 | *CME | ES | SEP12 | WORKING | B | 2000 | 0 | 0 | [LTP-1] | LIMIT | GTD | | | TIME SLICED |
| 1.1 | CME | ES | SEP12 | WORKING | B | 400 | | | 101300 | LIMIT | GTD | | | |
| 1.2 | CME | ES | SEP12 | WORKING | B | 600 | | | 101250 | LIMIT | GTD | | | |
| 1.3 | CME | ES | SEP12 | WORKING | B | 400 | | | 101375 | LIMIT | GTD | | | |
| 1.4 | CME | ES | SEP12 | WORKING | B | 200 | | | 101325 | LIMIT | GTD | | | |
| 1.5 | CME | ES | SEP12 | WORKING | B | 400 | | | 101325 | LIMIT | GTD | | | |

*FIGURE 3*

| REDUCTION AMOUNT = 10 | | | |
|---|---|---|---|
| CHILD ORDERS | | | |
| # | QTY | AVAILABLE | FILLED |
| 1 | 0 | YES | 0 |
| 2 | 0 | YES | 0 |
| 3 | 0 | YES | 15 |
| 4 | 8 | YES | 7 |
| 5 | 10 | NO | 0 |

| IN-FLIGHT | |
|---|---|
| # | QTY |
| 5 | 10 |
| | |
| | |
| | |
| | |

*FIGURE 6C*

| REDUCTION AMOUNT = 2 | | | |
|---|---|---|---|
| CHILD ORDERS | | | |
| # | QTY | AVAILABLE | FILLED |
| 1 | 0 | YES | 0 |
| 2 | 0 | YES | 0 |
| 3 | 0 | YES | 15 |
| 4 | 0 | YES | 7 |
| 5 | 10 | YES | 0 |

| IN-FLIGHT | |
|---|---|
| # | QTY |
| | |
| | |
| | |
| | |
| | |

*FIGURE 6D*

SLICER ORDER QUANTITY REDUCTION TOOL

CROSS REFERENCE TO RELATED APPLICATIONS

This application is a continuation of U.S. patent application Ser. No. 16/287,164, filed Feb. 27, 2019, now U.S. Pat. No. 10,565,653, which is a continuation of U.S. patent application Ser. No. 14/244,590, filed Apr. 3, 2014, now U.S. Pat. No. 10,255,634, which is a continuation of U.S. patent application Ser. No. 13/416,561, filed Mar. 9, 2012, now U.S. Pat. No. 8,732,067, the contents of each of which are fully incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

A slicer order is a synthetic strategy that involves breaking or slicing one order into multiple component orders that are traded separately. For example, an order may be time sliced and/or volume sliced. Slicer orders may be utilized to, for example, reduce a market impact when a total desired quantity of an order is large relative to market liquidity.

BRIEF DESCRIPTION OF THE FIGURES

Certain embodiments are disclosed with reference to the following drawings.

FIG. 3 illustrates a screenshot of an example slicer order status screen.

FIGS. 6A-D are diagrams illustrative of different stages of an example slicer order.

Figure 1:
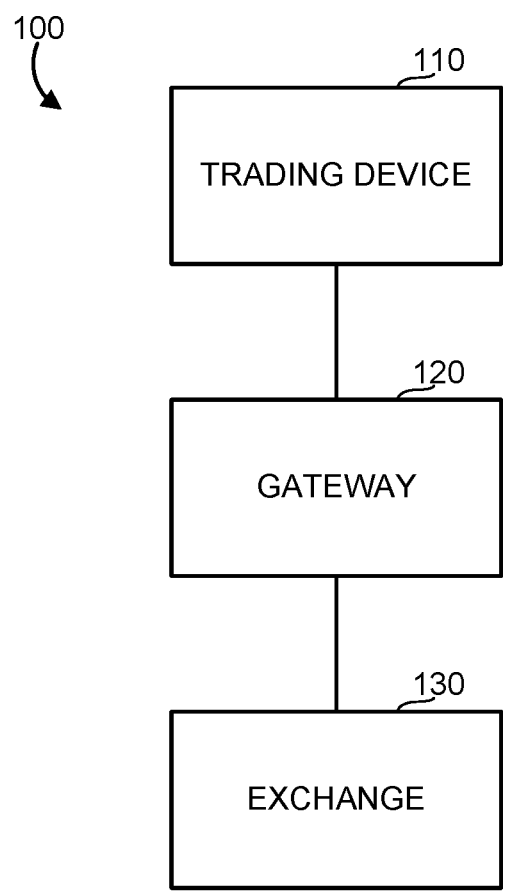
FIG. 1 illustrates a block diagram of an example electronic trading system in which certain embodiments disclosed herein may be employed.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

I. Brief Description of Certain Embodiments

The disclosed embodiments generally relate to a slicer order quantity reduction tool. A slicer order is a synthetic strategy that involves breaking or slicing one order into multiple component orders that are traded separately. A trading device may formulate how to slice one order into multiple component orders and execute those component orders based on instructions provided by a user to assist the user. The order to be sliced is referred to herein as a parent order, while the component orders into which the parent order is sliced are referred to herein as child orders. The parent order has a quantity that is broken down into component quantities in the child orders that add up to the parent quantity.

There are different types of slicer orders including, for example, time slicer orders and volume slicer orders. Depending on a type of slicer order, each child order is triggered (for example, sent to a market or an exchange) by one or more events or conditions. For example, the child orders of a time slicer order can be sent to one or more markets when a respective time interval is reached. In such instances, each time a clock reaches a time interval defined in the time slicer order as a trigger, a trading device sends one or more of the child orders to the market(s). For example, a time slicer order may be defined such that one of the child orders is sent every five or ten minutes. On the other hand, child orders of a volume slicer order can be sent to one or more markets when the market(s) experience a designated trading volume. In such instances, one or more child orders of a volume slicer order are sent to the market(s) when the market(s) for which the child order(s) are destined have sufficient activity (as defined in settings associated with the volume slicer order, for example). For example, a volume slicer order may be defined such that one of the child orders is sent each time the destination market executes trade(s) five hundred of the corresponding tradeable object. Other types of triggering conditions or events are possible for slicer orders. For example, child orders may be triggered by an amount of rainfall in a particular region, by daily temperature readings in a particular region, etc. Additionally or alternatively, a slicer order (of any type) could be configured to respond to user input to send one or more child orders at a non-scheduled time or a time not automatically triggered by, for example, a preconfigured triggering event. In other words, the user can trigger conveyance of one or more child orders to one or more markets at any time.

Slicer orders may be utilized by a user to, for example, reduce the market impact when a total desired quantity of a desired order is large relative to the market liquidity. If an order is large enough, placement of the order on a market may adversely impact an affected price. In such instances, a time slicer order can be utilized to break the large order into a plurality of relatively smaller orders child orders that are individually less likely to adversely impact the respective market than the larger parent order. Additionally or alternatively, a volume slicer order can be utilized to place child orders into a market based on volume of activity at the market. These and other types of slicer orders can be utilized to implement additional or alternative strategies or to achieve additional or alternative benefits.

Embodiments disclosed herein relate to reducing a total quantity of a slicer order in accordance with a request received from a user of the trading device. To enable such a reduction, certain embodiments sort child orders that make up a parent order according to a distance from market associated with each child order. In some examples, the child order farthest from the market is the child order having a buy or sell price furthest away from the current market price. In some examples, the child order farthest from market is the child order most recently sent to the market. In some examples, the child order farthest from the market is the child order currently scheduled to be the last of the child orders sent to the market. Additional or alternative techniques are possible for determining a distance from market for the child orders of the parent order. In most instances, a first child order farther from the market than a second child order will be filled (or at least partially filled) after the second child order. Thus, embodiments disclosed herein that sort the child orders according to distance from the market may create, for example, a list or table of child orders sorted by a respective likelihood of being filled before the other child orders. Embodiments disclosed herein use the sorted list to select child orders farthest from the market for the requested modification in total quantity of the parent order. By attempting to modify the child orders farther from market to meet the requested modification, embodiments disclosed herein increase a likelihood that the requested modification will be successfully executed before the child orders are filled and, thus, no longer available for modification. Alternatively, in some examples, the child orders closest to the market or at least closer to the market than the farthest child order are selected for the requested modification in total quantity for the parent order.

Further, embodiments disclosed herein analyze the sorted child orders to determine whether enough quantity in the child orders remains (for example, has not been filled) to meet the requested quantity reduction and, if so, which of the child orders should be altered (for example, via cancellation of at least a portion of respective quantit(ies)) to meet the desired reduction. In analyzing the child orders, embodiments disclosed herein consider inflight orders and, in some instances, make further calculations as data regarding the inflight orders returns to the trading device. Depending on the results of the above calculations, embodiments disclosed herein cancel quantities of the child order(s) as needed to most effectively meet the requested quantity reduction. As described in greater detail below, embodiments disclosed herein use the analysis of the sorted child orders to increase a likelihood that a trading device is able to achieve the requested decrease in total quantity for the parent order. Further, as described in greater detail below, embodiments disclosed herein enable the trading device to achieve the requested quantity reduction without having to cancel more child orders than is necessary.

Although the following discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

Certain embodiments provide a method for reducing a quantity of a slicer order including calculating a collective quantity associated with available ones of a plurality of child orders; comparing the collective quantity and a reduction amount received in connection with a quantity reduction request for the slicer order; and determining by the computing device, when the comparison indicates that the available ones of the child orders have insufficient quantity to meet the reduction amount, whether inflight ones of the plurality of child orders collectively have sufficient quantity to make up a shortfall of the available ones of the child orders.

Certain embodiments provide a tangible computer readable storage medium including instructions that, when executed, cause a computing device to at least calculate a collective quantity of available ones of a plurality of child orders; compare the collective quantity of the available child orders and a reduction amount received in connection with a quantity reduction request for a slicer order; and when the comparison indicates that the available ones of the child orders have insufficient quantity to meet the reduction amount, determine whether inflight ones of the plurality of child orders collectively have sufficient quantity to make up a shortfall of the available ones of the child orders.

Certain embodiments provide an apparatus for reducing a quantity of a slicer order including a receiver to receive a quantity reduction request including a reduction amount; a first analyzer to calculate a collective quantity of available ones of a plurality of child orders; a comparator to compare the collective quantity of the available child orders to the reduction amount; and a second analyzer to, when the comparator indicates that the available ones of the child orders have insufficient quantity to meet the reduction amount, determine whether inflight ones of the plurality of child orders collectively have sufficient quantity to make up a shortfall of the available ones of the child orders.

II. Example Electronic Trading System

FIG. 1 illustrates a block diagram of an example electronic trading system 100 in which certain embodiments may be employed. The system 100 includes a trading device 110, a gateway 120, and an electronic exchange 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. In addition, market data is sent from the exchange 130 through the gateway 120 to the trading device 110. The user may also utilize the trading device 110 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 110. There may be a real tradeable object that corresponds and/or is similar to a synthetic trading object.

The trading device 110 may include one or more electronic computing platforms such as a hand-held device, laptop, desktop computer, workstation with a single or multi-core processor, server with multiple processors, and/or cluster of computers, for example. For example, while logically represented as a single device, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 may include an electronic trading workstation, a portable trading device, an algorithmic trading system such as a "black box" or "grey box" system, an embedded trading system, and/or an automated trading tool, for example. For example, the trading device 110 may be a computing system running a copy of X_TRADER®, an electronic trading platform provided by Trading Technologies International, Inc. of Chicago, Ill. As another example, the trading device 110 may be a computing device running an automated trading tool such as Autospreader® and/or Autotrader™, also provided by Trading Technologies International, Inc.

As another example, the trading device 110 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into the computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment that does not effectuate real-world trades.

The orders sent by the trading device 110 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the order based on fill confirmations received from the exchange 130, for example. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

In general, the exchange 130 may be owned, operated, controlled, or used by an exchange entity. Example exchange entities include the CME Group, the New York Stock Exchange/London International Financial Futures and Options Exchange ("NYSE LIFFE"), the IntercontinentalExchange ("ICE"), and Eurex. The exchange 130 may include an electronic matching system, such as a computer, server, or other computing device, that is adapted to allow tradeable objects, for example, offered for trading by the exchange, to be bought and sold. The electronic matching system may include a matching engine, for example. The exchange 130 may include separate entities, some which list and/or administer tradeable objects and others which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system, for example. The market data may be provided to the trading device 110, for example. The market data may be provided to the trading device 110 through the gateway 120, for example. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information.

In certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

III. Example Computing Device

Figure 2:
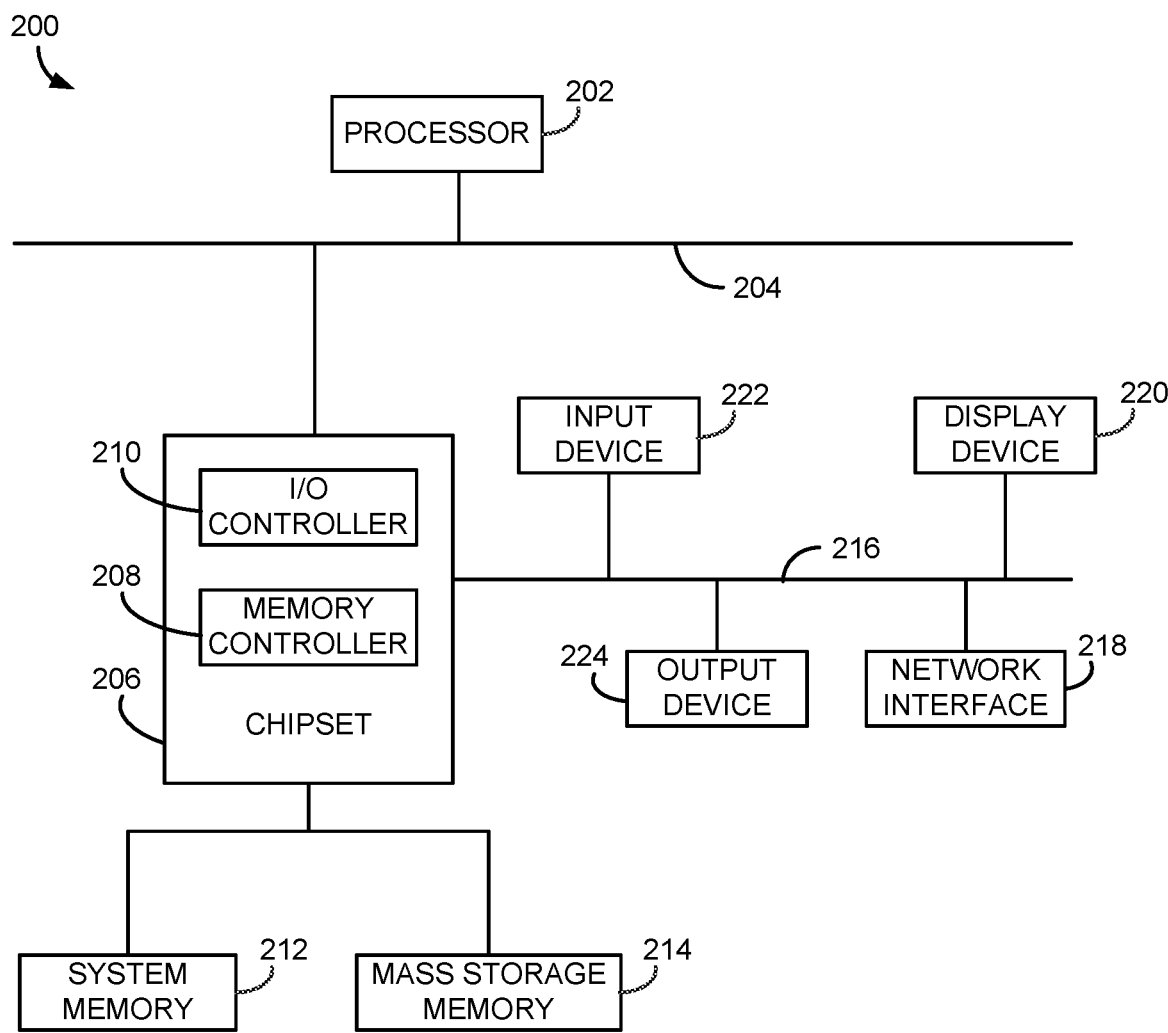
FIG. 2 illustrates a block diagram of an example computing device that may be used to implement the disclosed embodiments.

FIG. 2 illustrates a block diagram of an example computing device 200 that may be used to implement the disclosed embodiments. The trading device 110 of FIG. 1 may include one or more computing devices 200, for example. The gateway 120 of FIG. 1 may include one or more computing devices 200, for example. The exchange 130 of FIG. 1 may include one or more computing devices 200, for example.

The computing device 200 includes a processor 202, an interconnection bus 204, a chipset 206, a memory controller 208, an input/out (I/O) controller 210, a system memory 212, a mass storage memory 214, an I/O bus 216, a network interface 218, a display 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. As another example, the computing device 200 may not include an output device 224 separate from the display device 220. As another example, the computing device 200 may not include a display device 220. As another example, the computing device 200 may not include an input device 222. Instead, for example, the computing device 200 may be controlled by an external or remote input device via the network interface 218.

The computing device 200 includes a processor 202 that is coupled to an interconnection bus 204. The interconnection bus 204 may include a communication bus, channel, network, circuit, switch, fabric, or other mechanism for communicating data between components in the computing device 200. The interconnection bus 204 may be communicatively coupled with and transfer data between any of the components of the computing device 200. For example, during an installation process of a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be a processor, processing unit, or microprocessor, for example. The processor 202 may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 200 may be a multi-processor system and, thus, may include one or more additional processors that are communicatively coupled to the interconnection bus 204.

The processor 202 may be operable to execute logic encoded in one or more tangible media, such as the system memory 212, the mass storage memory 214, and/or via the network interface 218. As used herein, logic encoded in one or more tangible media includes instructions that are executable by the processor 202 or a different processor. The logic may be stored as part of software, hardware, integrated circuits, firmware, and/or micro-code, for example. The logic may be received from an external communication device via a communication network, for example, connected to the Internet. The processor 202 may execute the logic to perform the functions, acts, or tasks illustrated in the figures or described herein.

The processor 202 of FIG. 2 is coupled to the chipset 206, which includes the memory controller 208 and the I/O controller 210. A chipset typically provides I/O and memory management functions as well as a plurality of general purpose and/or special purpose registers and timers that are accessible or used by one or more processors coupled to the chipset 206. The memory controller 208 performs functions that enable the processor 202 (or processors if there are multiple processors) to access the system memory 212 and the mass storage memory 214.

The system memory 212 and the mass storage memory 214 may be one or more tangible media, such as computer readable storage media, for example. The system memory 212 may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 214 may include various types of mass storage devices including, for example, a hard disk drive, optical media, magnetic tape, any other tangible data storage device, or any combination thereof. In certain embodiments, the system memory 212 and the mass storage memory 214 are non-transitory.

The system memory 212 and the mass storage memory 214 may be a single memory module, for example. The system memory 212 and the mass storage memory 214 may be adjacent to, part of, programmed with, networked with, and/or remote from processor 202, such that data stored in the system memory 212 and the mass storage memory 214 may be retrieved and processed by the processor 202, for example. The system memory 212 and the mass storage memory 214 may store instructions that are executable by the processor 202. The instructions may be executed to perform one or more of the acts or functions described herein or shown in the figures.

The I/O controller 210 performs functions that enable the processor 202 to communicate with the network interface 218, the display 220, the input device 222, and the output device 224 through an I/O bus 216. While the memory controller 208 and the I/O controller 210 are depicted in FIG. 2 as separate blocks within the chipset 206, the functions performed by these blocks may be integrated within a single semiconductor circuit or may be implemented using two or more separate integrated circuits. One or more of the components of the computing device 200 may be implemented as a system on a chip (for example, a system on a chip in an IPHONE™).

The network interface 218 may be a one-way or two-way communication coupling. Accordingly, the network interface 218 may communicatively connect one, two, or more communication networks or devices. For example, the interconnection bus 204 may be coupled with a gateway similar to gateway 120 of FIG. 1 discussed above via the network interface 218, such that one, some, or all of the components of the computing device 200 are accessible or may communicate with the gateway. As another example, the network interface 218 may couple the interconnection bus 204 with other communication networks. The network interface 218 may be, for example, an integrated services digital network (ISDN) card or a modem to provide a data communication connection. As another example, network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information, for example.

The display device 220 may include a visual output device, cathode ray tube (CRT) display, electronic display, electronic paper, flat panel display, light-emitting diode (LED) display, electroluminescent display (ELD), plasma display panel (PDP), liquid crystal display (LCD), thin-film transistor display (TFT), organic light-emitting diode display (OLED), surface-conduction electron-emitter display (SED), laser television, carbon nanotubes, nanocrystal display, head-mounted display, projector, three-dimensional display, and/or transparent display device, for example.

The display device 220 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 220 and/or the input device 222 may be used to interact with the trading screen, for example.

The input device 222 may include a keyboard, mouse, microphone, touch-screen, trackball, keypad, joystick, and/or other device for providing input, for example. The input device 222 may be used, for example, to provide command selections to processor 202. For example, the input device 222 may be a mouse that is used to control a cursor displayed on a trading screen. The mouse may include one or more buttons for selection and control, for example.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

IV. Slicer Orders

Slicer orders have component parts (referred to herein as child orders) that are separately sent to one or more markets to collectively buy or sell a total quantity of a tradeable object. To implement a slicer order, a trading device sends at least one of the child orders to one or more markets in response to, for example, an event or condition defined in the slicer order, such as an amount of time elapsing or a volume of activity occurring at the market(s). After an initiation or activation of the slicer order, the trading device automatically sends the child orders, when triggered, to the market(s)

to collectively buy or sell the total quantity of the parent order. In addition to or in lieu of automatically sending child orders to the markets in response to triggers or detected events, the trading device can send child orders in response to direct user input. In other words, the user can instruct the trading device to send a child order and the trading device assists the user by, for example, tracking fill quantity and prices, insuring a sum of the child quantities does not exceed the parent quantity, processing delete and quantity change requests, etc.

FIG. 3 is an example screenshot 300 of a user interface that communicates slicer order information to a user of a trading device, such as the trading device 110 of FIG. 1. As described above, different types of slicer orders are possible and the example screenshot 300 is included for purposes of illustration. The example screenshot of FIG. 3 shows a parent order 302 having a plurality of child orders 304. Each of the child orders 304 has a designated quantity, which is shown in a quantity column 306, and a price, which is shown in a price column 308. The order quantities of the child orders 304 add up to the total quantity of the parent order 302. The example screenshot 300 includes an undisclosed quantity column 310 to indicate a quantity of a corresponding order that has not yet been sent to market. As shown in FIG. 3, the child orders 304 have all been sent to a market and, thus, the undisclosed quantity of the slicer order is zero. As the example slicer order shown in FIG. 3 is a time slicer order, each of the child orders 304 has been sent to one or more markets defined in an exchange column 312 when a defined time interval elapsed and/or when a time and date occurred. As the child orders 304 are sent to market and are filled, a filled quantity column 314 is updated to indicate how much of the respective child order quantities and the parent order quantity is filled. Additionally, as the child orders 304 are sent to market(s), a status column 316 is updated to indicate a current status of the child orders. The example of FIG. 3 includes additional or alternative information not described herein and may include additional alternative information than shown in FIG. 3.

As markets and other factors are constantly changing, a user associated with the slicer order may wish to adjust one or more aspects of the slicer order after the slicer order is working in a market. In other words, the user may wish to reduce, for example, the total quantity of the parent order after at least a portion of at least one of the child orders has been sent to the market(s). However, meeting a requested reduction in total quantity may be difficult to achieve. For example, one or more of the child orders may have already been filled by the time the desired quantity reduction is conveyed to a trading device (for example, via a user interface associated with the example screenshot 300 of FIG. 3) implementing the slicer order. Additionally or alternatively, one or more of the child orders may be inflight when the desired quantity reduction is conveyed to the trading device. An inflight child order is one for which the trading device has not yet received a confirmation message in response to a message, query, or other type of communication that was sent to, for example, an exchange. In other words, an inflight child order is one that has an outstanding communication, the results of which are unknown to the trading device. For example, the trading device may have sent an order for a tradable object at a certain price but has not yet been informed as to whether or not the order has been accepted by the exchange. Such an order having an unconfirmed communication is referred to as an inflight order.

Unlike previous systems, embodiments disclosed herein reduce a total quantity of a slicer order as requested by a user without having to cancel or reduce more child orders than is necessary. Further, embodiments disclosed herein reduce slicer order quantities rapidly, thereby lessening unwanted consequences of, for example, the child orders (or too many of the child orders) of the slicer order being filled even after the decision to reduce the quantity has been made. Embodiments disclosed herein to effectively and rapidly reduce a total quantity of a slicer order are described in greater detail below.

V. Slicer Order Quantity Reduction Tool

Figure 4:
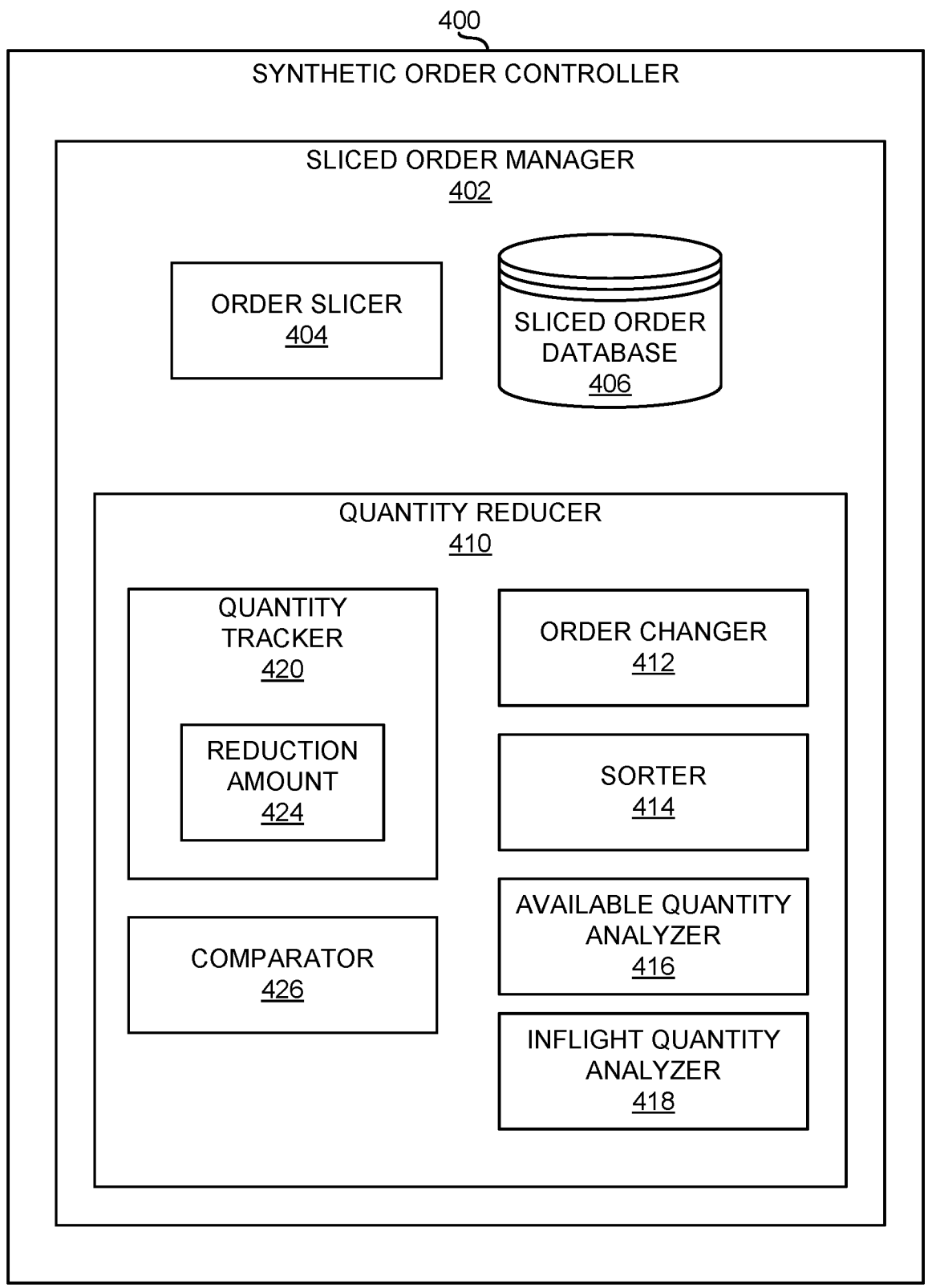
FIG. 4 illustrates a block diagram of an example apparatus that may be used to implement an example synthetic order controller including an example quantity reducer.

FIG. 4 is a block diagram of an example synthetic order controller 400 that may be used to implement certain embodiments disclosed herein. In addition to other types of synthetic orders to implement different trading strategies (for example, trailing orders or retry orders), the example synthetic order controller 400 of FIG. 4 implements slicer orders using a slicer order manager 402.

The example slicer order manager 402 includes an order slicer 404 to break down a parent order into child orders in accordance with, for example, instructions provided by a user. In some examples, the order slicer 404 is provided with explicit instructions regarding triggers, prices, quantities, etc. to implement the breakdown of the parent order. In some examples, the order slicer 404 includes one or more predefined slicing strategies that break the parent order into child orders according to a predefined configuration involving a manner in which one or more parameters (for example, triggers, prices, quantities, volumes, etc.) of the slicer order are to be set. In some examples, the order slicer 404 combines user instructions regarding first parameter(s) with predefined configuration(s) to set the parameters of the slicer order.

When the example order slicer 404 of FIG. 4 configures the requested slicer order, the configuration, parameters, and other data related to the slicer order are stored in a slicer order database 406. The example slicer order database 406 can store the slicer order data in any suitable manner or data structure such that the data of the stored slicer orders is readily available to other components of the example controller 400.

The example slicer order manager 402 also includes a quantity reducer 410 to meet requests for reductions in total quantity for slicer orders. The example quantity reducer 410 of FIG. 4 receives requests from users associated with slicer orders stored in the database 406 (or any other storage device). In some instances, the slicer order associated with the request is not yet working in a market (for example, no child order has been sent to market). When the slicer order associated with the reduction request is not working in a market yet, the example quantity reducer 410 uses an order changer 412 to adjust the slicer order according to the received request by, for example, reducing the undisclosed quantity of the parent order. Because no child order has been sent to the market yet, the example order changer 412 of FIG. 4 does not encounter significant difficulty in adjusting the quantity.

On the other hand, when a quantity reduction is received in connection with a slicer order that is working at least one child order in the market, the necessary adjustments may not be as straightforward as adjustments made to slicer orders that have not yet sent a child order to market (do not have any working child orders). For example, when the synthetic order controller 400 is working at least a portion of the slicer order in the market, that portion is exposed to the possibility of being at least partially filled before the requested quantity reduction is achieved. In such instances, the example quantity reducer 410 of FIG. 4 provides rapid resolution to the requested quantity reduction and does so without having to cancel more quantity than is necessary, as is commonly done in existing systems that simply cancel the entire remaining orders of the working slicer order. In particular, as described in detail below, the example quantity reducer 410 selects child order(s) from which quantity is to be cancelled and begins cancelling quantity from the selected child orders until the requested quantity reduction is met.

The example quantity reducer 410 of FIG. 4 makes the selection of child orders through which the requested reduction is to be accomplished in a manner that decreases a likelihood that modification attempts (by the order changer 412) are thwarted by a target order becoming unavailable for modification. For example, in the time it takes to realize that a modification request (such as a quantity change, a cancel/replace, or deletion request) for a certain child order is called for and to submit the corresponding modification request, at least a portion of that child order may have been filled. If so, orders are being filled in contrast to the wishes of the user during the time it takes select another child order for the requested reduction and to submit the modification request. To decrease the chances of modification attempts being unsuccessful, the example quantity reducer 410 includes a sorter 414. The example sorter 414 sorts child orders that have not been entirely filled according to distance from market. As used herein, the phrase "distance from market" is a relative term that refers to how likely a particular working child order will be filled earlier (or later) than other working child orders of a parent order. In the illustrated example, the sorter 414 sorts working child orders according to corresponding prices and times that the working child orders were sent to the market. In the illustrated example, the working child orders are first sorted by a respective price and the example sorter 414 determines a relative distance to the current market for each child order with respect to the other child orders. In the illustrated example, for child orders at the same price, the sorter 414 sorts the child orders based on a respective time sent to the market. The example sorter 414 considers a first child order sent to the market before a second child order closer to the market than the second child order. Alternatively, the example sorter 414 can sort the child orders based solely on time sent to the market. Alternatively, the example sorter 414 can sort the child orders based on time sent to the market and, for any child orders sent at the same time, sort the child orders based on price. In some embodiments, the example sorter 414 can sort the child orders based at least in part on order size. For example, at an exchange that matches based at least in part on a pro rata matching algorithm, a higher quantity order at the same price level may have a higher likelihood of being filled than a lower quantity order at that price level.

The example sorter 414 places the child order having the greatest distance to market at a head of a sorted list and the child order having the shortest distance to market at the bottom of the sorted list. When the example order changer 412 is caused to submit modification requests to meet a requested quantity reduction for a parent order, the sorted list managed by the sorter 414 is queried to determine which of the child orders is farthest from the respective market. In the illustrated example, the order changer 412 selects child orders to reduce from the sorted list from farthest from market to closest to market. In doing so, the example order changer 412 first attempts to modify or delete quantity from the child order(s) least likely to become unavailable (for example, filled) and, thus, to cause problems or complications for the order changer 412. Accordingly, the example order changer 412 and the sorter 414 reduce the likelihood that a modification or deletion request will be denied. In turn, the example order changer 412 and the sorter 414 increase the speed at which the requested reduction is executed.

To further increase the speed at which the requested reduction is performed, the example quantity reducer 410 includes an available quantity analyzer 416 and an inflight quantity analyzer 418. The example available quantity analyzer 416 and the example inflight quantity analyzer 418 work in conjunction with a quantity tracker 420 to meet a requested reduction in total quantity for a parent order. In particular, the example quantity tracker 420 tracks a reduction amount 424 for the parent order. The reduction amount 424 initially reflects a quantity that the user associated with the received request desires to cancel from the parent order. As the order changer 412 cancels quantity from the child orders, the reduction amount 424 is decremented. In particular, the reduction amount 424 is decremented when confirmation of a cancellation request is received from an exchange that verifies that the requested cancellation was successful. In other words, the reduction amount 424 is decreased as the order changer 412 successfully reduces the total quantity of the parent order per the request. For example, the reduction amount 424 may be initialized to a value of one hundred (100) when a user indicates a desire to reduce a parent order having a current quantity of three hundred (300) to having a quantity of two hundred (200). The reduction amount 424 is decremented to, for example, eighty (80) when the order changer 412 successfully cancels a quantity of twenty (20) from one or more of the child orders. Because the quantity reducer 410 can cancel or modify quantity of the child orders in simultaneous batches, the example reduction amount 424 may be decremented sequentially or in batches as confirmations from the exchange may be simultaneously received at the trading device 110.

The example available quantity analyzer 416 determines a collective amount of quantity in the available child orders at a given time. As used herein, an available child order refers to a working child order that is not inflight. As used herein, an inflight child order is a working order that has an outstanding communication or message pending and, thus, the status of the inflight child order is unknown to the trading device 110 at that time. Thus, the example available quantity analyzer 416 determines a collective amount of quantity associated with the child orders having a known status to the trading device 110. The example inflight quantity analyzer 418 determines a collective amount of quantity associated with child orders having an unknown status to the trading device 110. The quantity determined by the example inflight quantity analyzer 418 is equal to the sum of the quantity of the inflight child orders adjusted assuming the outstanding modification of the inflight child orders is successful. For example, if first and second inflight child orders each have an unfilled quantity of ten (10) and the first inflight child order has a pending modification to reduce the quantity by 2 (to 8) and the second inflight child order has a pending modification to reduce the quantity by 3 (to 7), then the example inflight quantity analyzer 418 determines the collective quantity associated with the inflight child orders to be 15. Note that this is so, even though the modifications may not be successful and/or some or all of the quantity of the inflight child orders may be filled before responses (such as confirmations) related to the modifications are received. The example quantity reducer 410 also includes comparator 426.

As described in detail below in connection with FIGS. 5 and 6A-D, the comparator 426 compares the reduction amount 424 to a collective amount of available quantity calculated by the example available quantity analyzer 416. If the comparator 426 determines that the collective amount of quantity in the available child orders is insufficient to meet the reduction amount 424, the comparator 426 triggers the inflight quantity analyzer 418 to calculate a collective quantity of inflight child orders. The example comparator 426 compares the reduction amount 424 to a sum of the collective quantity of the inflight child orders and the collective quantity of the available child orders to determine whether the inflight child orders can make up for the shortfall of the available child orders. If so, the order changer 412 cancels the available child orders and an amount of the inflight orders as they return (become available) as needed to meet the reduction amount 424. Otherwise, the order changer 412 converts the quantity reduction request to a parent order cancellation to cancel the remaining quantity of the child orders. As a result, the example quantity reducer 410 meets the quantity reduction request effectively and rapidly. The example quantity reducer 410 is described in greater detail below in connection with FIGS. 5 and 6A-D.

Figure 5:
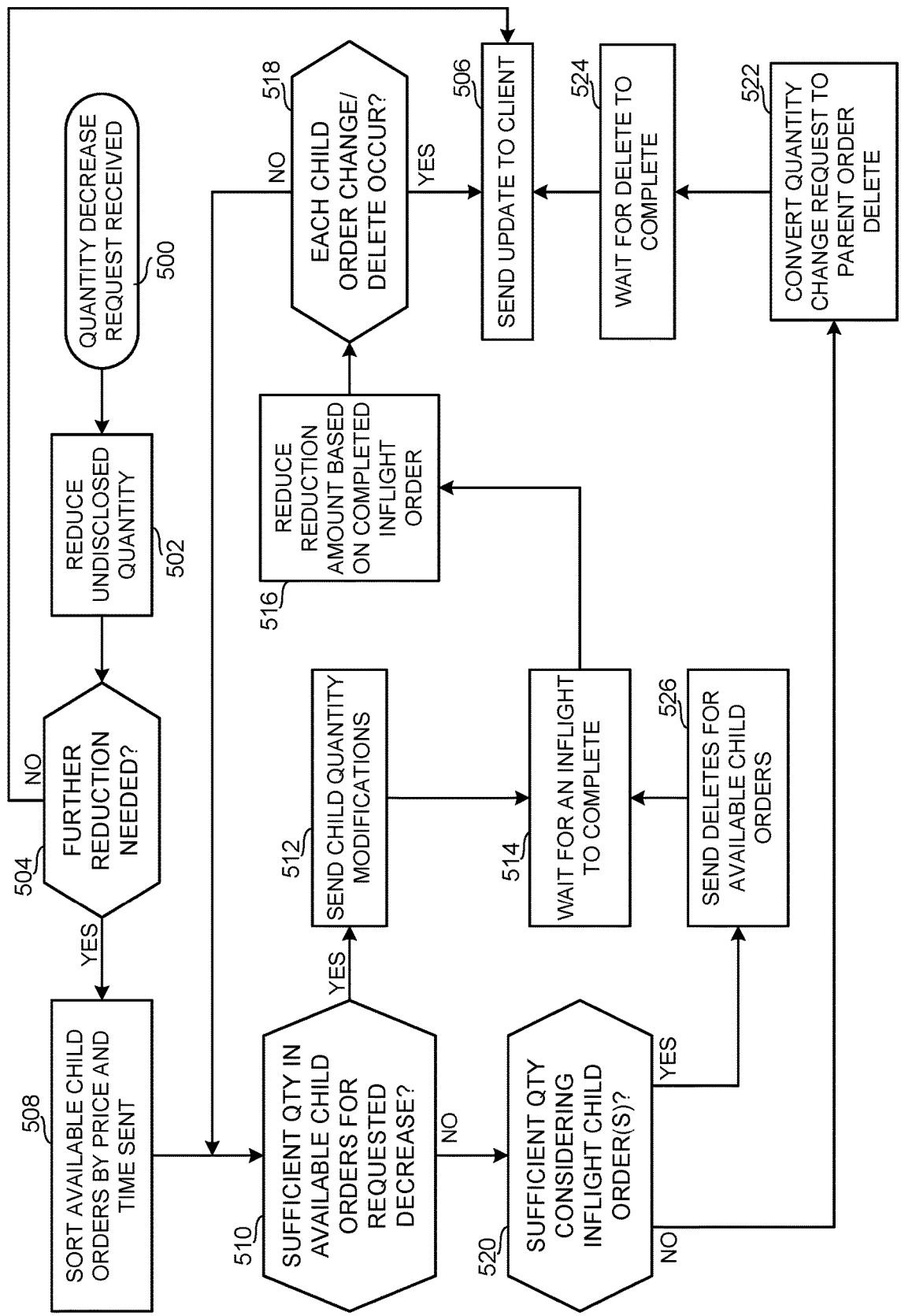
FIG. 5 is a flow diagram illustrative of example machine readable instructions that may be executed to implement the example quantity reducer of FIG. 4.
Figure 6A:
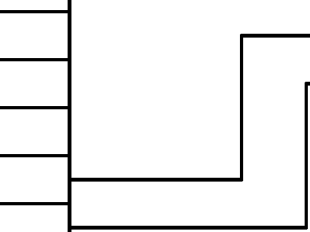

FIG. 5 is a flowchart of an example process to implement the example quantity reducer 410 of FIG. 4. FIG. 5 is described herein in connection with FIGS. 6A-D for purposes of illustration and not limitation. At block 500, the example of FIG. 5 begins with receipt of a quantity reduction request from a user at a trading device, such as the trading device 110 of FIG. 1, in connection with a slicer order having at least one child order. Alternatively, the quantity reduction request can be generated by the trading device 110 (for example, in response to an event or condition). The example quantity tracker 420 initializes the reduction amount 424 to equal the amount of quantity of the received request. As an example, FIG. 6A shows an example time slicer order having a current quantity of fifty (50) with five (5) child orders having varying quantities. Again with reference to the example of FIG. 6A, the received reduction request indicates that the user wishes to reduce the parent order that has a current quantity of fifty (50) to a quantity of thirty (30). Thus, the quantity tracker 420 initializes the reduction amount 424 to twenty (20).

When the reduction request is received at block 500, the example quantity reducer 410 may wait for any inflight orders to complete (for example, by detecting responses to corresponding outstanding or pending communications) in some examples. In the illustrated example of FIG. 5, at block 502, the order changer 412 cancels any undisclosed quantity from the slicer order to meet as much of the reduction request as possible. That is, the order changer 412 cancels any quantity that has not yet been sent to market. The reduction amount 424 is decremented according to an amount of undisclosed quantity that was cancelled. At block 504, the example quantity reducer 410 determines whether the reduction amount 424 has been met (for example, has been reduced to zero (0)) after the cancellation of the undisclosed quantity. If so, control proceeds to block 506 and the quantity reducer 410 sends a communication (for example, a letter template, an email, a response to the trading device 110, etc.) to the requesting client that the reduction request has been met. Otherwise control proceeds to block 508. In the example of FIG. 6A, the slicer order does not include undisclosed quantity and, thus, no action is taken with respect to undisclosed quantity at block 502 of FIG. 5. Accordingly, for the example scenario shown in FIG. 6A, control proceeds to block 508 and the reduction amount 424 is not decremented in connection with cancellation of undisclosed quantity.

At block 508, the example sorter 414 sorts the working child orders (for example, child orders that have not already been entirely filled) according to distance from market. As described above, the example sorter 414 of FIG. 4 places the child order farthest from market at the top of a sorted list maintained by the sorter 414. As an example with reference to FIG. 6A, the sorter 414 has sorted the child orders according to distance to market and assigned each child order an identifier (one, two, three, four, and five). Thus, child order #1 is the farthest from market and child order #5 is the closet to market. As described above, the sorter 414 may sort the child orders according to price, time sent, a combination of price and time sent, or any other suitable measurement of distance to market.

At block 510, the comparator 426 compares the reduction amount 424 to a collective amount of quantity associated with the available child orders (working child orders that are not inflight), as calculated by the example available quantity analyzer 416. As described above, the reduction amount 424 indicates how much quantity needs to be cancelled to meet the received request and is decremented as quantity is cancelled. If the comparator 426 determines that the collective amount of quantity in the available child orders is equal to or greater than the reduction amount 424, the example order changer 412 sends modification requests for the reduction amount 424 starting with the child order at the top of the sorted list maintained by the sorter 414, at block 512. If the reduction amount 424 is greater than the quantity of the child order at the top of the sorted list, the example order changer 412 also sends modification requests for the next child order in the sorted list (the second from the top) at the same or a similar time as the modification requests for the child order at the top of the list. The order changer 412 continues down the sorted list until cancellation requests equal in number to the reduction amount 424 have been sent. For example, in FIG. 6A, the collective quantity of available child orders is twenty-five (25) and, thus, is greater than the reduction amount 424, which is twenty (20). According, the order changer 412 sends a first modification request to the market in connection with child order #1 to delete a quantity of five (5), a second modification request to the market in connection with child order #2 to delete a quantity of five (5), and a third modification request to the market in connection with child order #3 to modify the quantity of child order #3 from fifteen (15) to five (5). At block 514, the example quantity reducer 410 waits for the completion of the modification requests, which are considered inflight until acknowledged by the exchange 130. When one of the inflight modification requests are completed (for example, the exchange acknowledges the request and returns information related to the results of the modification request) at block 514, the quantity tracker 420 adjusts the reduction amount 424 according to the results of the modification request as indicated by the result information provided by the exchange 130, at block 516. For example, in FIG. 6B, which continues the scenario shown in FIG. 6A, the exchange indicates that the requested deletions of five (5) from child orders #1 and #2 were fully successful. Thus, at block 516, the quantity tracker 420 adjusts the reduction amount 424 to a value of ten (10) in response to such an acknowledgement from the exchange 130. As further shown in FIG. 6B, the exchange 130 also indicated that the requested modification of child order #3 from a quantity of fifteen (15) to five (5) could not be met at all because, for example, the entirety of child order #3 was filled before it could be cancelled. Accordingly, the reduction amount 424 remains at ten (10). At block 518, the quantity tracker 420 determines whether each of the requested modifications were successful. In the illustrated example, the quantity tracker 420 performs this determination as each inflight modification response is received. That is, the example quantity tracker 420 of the illustrated example does not wait for all inflight orders to resolve. Alternatively, the quantity tracker 420 can wait for all inflight orders to resolve. If so, control proceeds to block 506 and the client is updated that the reduction request was met. On the other hand, if each requested modification was not met at block 518, control returns to block 510.

Referring back to block 510, the comparator 426 may determine that the collective amount of quantity in the available child orders is less than that reduction amount 424. In such instances, the example comparator 426 determines whether there is sufficient quantity in the inflight orders to make up for the shortfall of the available child orders, at block 520. In particular, the example comparator 426 compares the reduction amount 424 to a sum of the collective amount of quantity in the available child orders and the collective amount of quantity in the inflight child orders as calculated by the inflight quantity analyzer 418. If the comparator 426 determines that the quantity of the inflight child orders is insufficient to make up for the shortfall at block 520, the order changer 412 converts the received quantity reduction request to a cancellation request for the entire parent order, at block 522. As a result, any remaining (unfilled) child orders are cancelled. The example quantity reducer 410 waits for confirmation of the cancellation(s) at block 524 and then sends an update to the user of the trading device 110 including data related to the filled portions of the slicer order and data related to the quantity reduction request, at block 506.

Referring back to block 520, the comparator 416 may determine that the inflight child orders have sufficient quantity to make up the shortfall of the available child orders to meet the reduction amount 424. If so, the example quantity reducer 410 knows that there is at least some likelihood that the reduction amount 424 can be met (despite the possibility that too much quantity will be filled before the order changer 412 can cancel enough quantity to meet the request). However, while the quantity reducer 410 is aware of the amount of quantity in the inflight child orders, the quantity reducer 410 is not certain of the amount of quantity that will remain after the inflight child orders are completed. As described above, the inflight child orders are those that are waiting for a confirmation message from, for example, the exchange 130. In the illustrated example, the quantity reducer 410 considers an inflight child order complete when a confirmation is received in connection with the message or communication that caused the child order to be inflight. In some examples, the confirmation for which the inflight child order is waiting may indicate that some or all of the order has been filled. If so, the filled quantity of the completed inflight child order cannot be cancelled by the order changer 412. Thus, while the comparator 426 previously determined that the collective amount of quantity in the inflight child orders was sufficient to meet the reduction amount at block 520, the collective amount of quantity in a completed inflight order (a formerly inflight order that is considered an available child order upon completion) may vary from the previously calculated amount of quantity.

Accordingly, the order changer 412 sends deletes for any available child orders at block 526 and then the example quantity reducer 410 waits for inflight orders to complete at block 514. Only after an inflight child order completes can the quantity reducer 410 know whether order changer 412 can actually cancel some or all of the corresponding quantity. As described above in connection with block 514, in response to one of the inflight child orders completing (without waiting for all other inflight orders to complete), control proceeds to block 516 and the reduction amount 424 is adjusted accordingly.

Figure 6B:
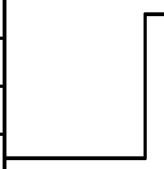

Referring to FIG. 6C, which continues the scenario shown in FIG. 6B, formerly inflight child order #4 is now available and the exchange 130 has indicated that a quantity of seven (7) has been filled in connection with child order #4 and a quantity of eight (8) remains unfilled. Per block 510 of FIG. 5, the quantity of the available child orders (a quantity of eight (8) in connection with child order #4) is insufficient to meet the reduction amount 424, which is ten (10). Further, per block 520 of FIG. 5, the quantity of the inflight orders (a quantity of ten (10) in connection with child order #5) is sufficient to meet the reduction amount 424 of ten (10). Accordingly, per block 526 of FIG. 5, a delete request for a cancellation of a quantity of eight (8) is sent to the exchange 130 in connection with child order #4.

Assuming that the deletion requests for the quantity of eight (8) is returned as fully successful the reduction amount is reduced to two (2) per block 516 of FIG. 5. Control loops back to block 510. FIG. 6D, which continues the scenario shown in FIG. 6C, shows a status of the slicer order after inflight child order #4 has completed at child order #5 is no longer inflight. Per block 510 of FIG. 5, sufficient quantity exists in the available child orders (ten (10) in child order #5) to meet the remaining reduction amount 424, which is two (2). Accordingly, a modification request to cancel a quantity of two (2) in connection with child order #5 is sent to the exchange 130, per block 512 of FIG. 5. If the exchange 130 indicates that the modification is successful, the reduction amount 424 is decremented to zero at block 516 and the client is updated that the requested quantity reduction has been met at block 506.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A method comprising:
    receiving by a trading device a quantity reduction request for a slicer order, wherein the slicer order is associated with at least one child order, and wherein the quantity reduction request comprises a requested reduction amount;
    initializing by the trading device a remaining reduction amount to be the requested reduction amount;
    calculating by the trading device an available quantity for available child orders, wherein the available child orders comprise child orders associated with the slicer order that are working at an exchange and not inflight;
    comparing by the trading device the available quantity and the remaining reduction amount; and
    sending by the trading device a request to the exchange to modify, when the comparison of the available quantity and the remaining reduction amount indicates that the available quantity is insufficient to satisfy the remaining reduction amount, each of the available child orders;
    reducing by the trading device the remaining reduction amount based on the modification of the available orders;
    calculating by the trading device, when the comparison indicates that the available quantity is insufficient to satisfy the remaining reduction amount, an inflight quantity for inflight orders, wherein the inflight orders are orders of the plurality of orders that are working at the exchange and are inflight, wherein the inflight quantity is the sum of the quantities of the inflight orders;
    comparing by the trading device the inflight quantity and the remaining reduction amount; and
    repeating by the trading device, when the comparison of the inflight quantity and the remaining reduction amount indicates that the inflight quantity is sufficient to satisfy the remaining reduction amount, until the remaining reduction amount is satisfied:
        waiting by the trading device for an inflight order to be completed;
        sending by the trading device a request to the exchange to modify the completed inflight order; and
        reducing by the trading device the remaining reduction amount based on the modification of the completed inflight order.

2. The method of claim 1, further comprising sorting by the trading device the child orders associated with the slicer order according to distance from market.

3. The method of claim 2, wherein a first child order having a greater distance from market than a second child order indicates that the first child order is likely to be filled later than the second child order.

4. The method of claim 2, wherein each of the available child orders is modified in order from farthest from market to nearest to market.

5. The method of claim 2, wherein the distance from market is calculated according to price, and wherein the distance from market is calculated according to time sent to market for child orders of the same price to maximize the likelihood that the modification will be successful.

6. The method of claim 1, wherein the quantity reduction request for the slicer order is generated by a trading device in response to at least one of an event and a condition.

7. The method of claim 1, wherein the request to modify an available child order comprises a request to cancel the available child order.

8. The method of claim 1, wherein the request to modify an available child order comprises a request to reduce the quantity of the available child order.

9. The method of claim 1, further comprising sending by the trading device a request to the exchange to modify, when the comparison of the available quantity and the remaining reduction amount indicates that the available quantity is sufficient to satisfy the remaining reduction amount, at least one of the available child orders.

10. The method of claim 1, wherein the quantity reduction request for the slicer order is received from a user.

11. The method of claim 1, wherein the request to modify a completed inflight child order comprises a request to cancel the completed inflight child order.

12. The method of claim 1, wherein the request to modify a completed inflight child order comprises a request to reduce the quantity of the completed inflight child order.

13. The method of claim 1, wherein calculating the inflight quantity for the inflight child orders comprises summing working quantities for each inflight child order.

14. The method of claim 1, further comprising:
    cancelling by the trading device an undisclosed quantity of the slicer order; and
    reducing by the trading device the remaining reduction amount based on the cancellation of the undisclosed quantity.

15. The method of claim 1, wherein calculating the available quantity for the available child orders comprises summing working quantities for each available child order.

16. The method of claim 1, further comprising sending by the trading device a notification of the reduction of the slicer order quantity.

* * * * *